United States Patent Office 3,481,125
Patented Dec. 2, 1969

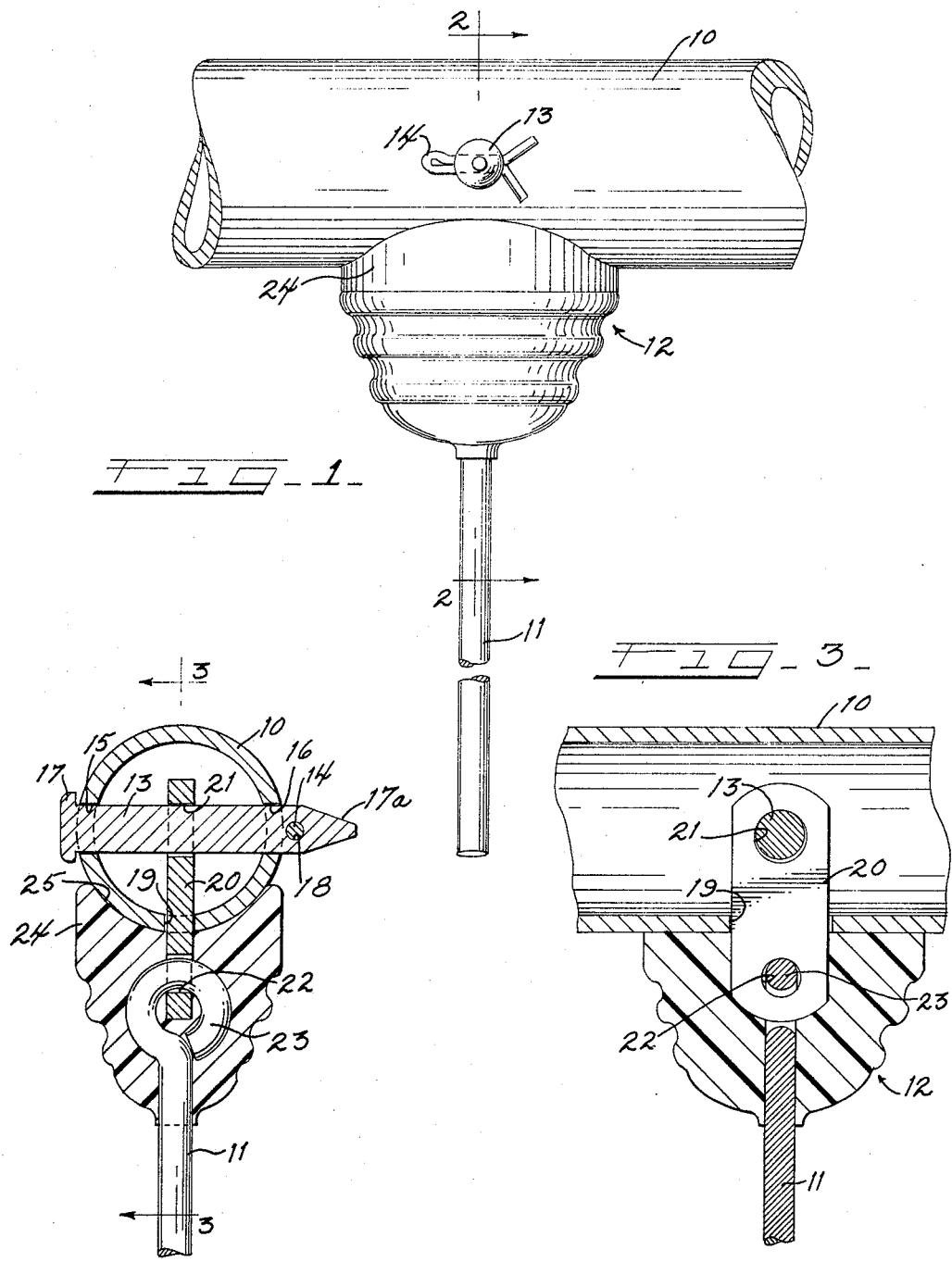

3,481,125
RAKE TOOTH MOUNTING
Robert H. Miller, Memphis, Tenn., assignor to International Harvester Company, Chicago, Ill., a corporation of Delaware
Filed Apr. 3, 1967, Ser. No. 628,105
Int. Cl. A01d 7/06
U.S. Cl. 56—400        7 Claims

ABSTRACT OF THE DISCLOSURE

A connection of a rake tooth to a bar of a side delivery type rake. A pin is mounted through the rake bar and a link bar is coupled to the pin and extends outwardly from the rake bar for connection to the rake tooth. A body of elastomer material is bonded to the connection between the link bar and the rake tooth for resiliently supporting the rake tooth with respect to the rake bar.

BACKGROUND OF THE INVENTION

The present invention relates generally to side delivery rakes and more particularly to mounting of rake teeth on the tooth bars of such rakes.

In an effort to reduce the common problem of tooth breakage on rakes, attempts have been made to mount the teeth on the rake bar by means of resilient rubber-like members. Under certain conditions the rubber-like mounting members produced more satisfactory results than were obtained with prior assemblies utilizing coil springs and the like. However, it has been found that the rubber-like mounting members are subject to fatigue failure induced by the multidirectional loading on the teeth, with the result that the teeth are separated from the bars of the rake.

SUMMARY

The present invention provides a simple and effective means for mounting the rake teeth on a rake bar such that the teeth will not separate from the rake bar during operation under even the most difficult conditions. Unlike the prior art devices the tooth mounting structure of the present invention does not rely solely upon the strength of a resilient mounting member for retaining the teeth on the rake bar. The teeth are coupled to the rake bar through an articulated connection which is resiliently supported by an elastomer member bonded to the connection.

BRIEF DESCRIPTION OF THE DRAWINGS

FIGURE 1 is a fragmentary elevational view of the tooth mounting structure in accordance with the invention;

FIGURE 2 is a sectional view taken in the direction of arrows 2—2 of FIGURE 1; and FIGURE 3 is a sectional view taken in the direction of arrows 3—3 of FIGURE 2.

DESCRIPTION OF THE PREFERRED EMBODIMENT

Referring first to FIGURE 1 there is shown a conventional tubular tooth bar 10 which may constitute one of the bars on a rotary rake reel as will be readily understood by those skilled in the art. The tooth bar 10 is adapted to receive a plurality of rake teeth, one of which being shown at 11. The rake tooth 11 is adapted to be coupled to the tooth bar 10 by means including a resilient elastomer mounting member 12. Further means for mounting tooth 11 on the bar 10 includes a pin 13 retained on the bar 10 by means including a cotter pin 14.

As shown in greater detail in FIGURE 2 the pin 13 extends diametrically through the rake bar 10 through a pair of aligned openings 15 and 16. The pin 13 includes an increased diameter head 17 at one end and terminates in a conical portion 17a at its other end. The pin 13 further includes a transverse opening 18 for receiving the cotter pin 14 to thus retain the pin 13 in the position shown.

The rake bar 10 includes a rectangular opening 19 defined through the bottom portion thereof midway between the openings 15 and 16. A link bar 20 is provided which includes an opening 21 for receiving the pin 13 such that the lower end portion of the link bar 20 extends outwardly from the rake bar 10 through the opening 19.

Th lower end portion of the link bar 20 includes an opening 22 for receiving a bent-over end 23 of the rake tooth 11. The diameter of the opening 22 may be slightly larger than that of the tooth 11 so that the tooth 11 may be articulated with respect to the link bar 20. Accordingly, the tooth 11 is capable of multi-directional pivoting at the connection with the link bar 20.

In accordance with a feature of the invention, the above mentioned mounting member 12 is provided for resiliently supporting the tooth 11 with respect to the rake bar 10 by reacting against the connection to resist articulation thereof. Toward that end, the member 12 includes a cylindrical portion 24 terminating at its upper end in a concave surface 25 adapted to engage the rake bar 10 with a complementary fit. The mounting member 12 includes a lower portion 26 of generally decreasing diameter surrounding and bonded to the connection of the tooth 11 and the link bar 20. The decreasing diameter or generally conical arrangement of the portion 26 lends flexibility to the member 12 in the area surrounding the connection of the tooth 11 and link bar 20. If desired, the periphery of the portion 26 may include a plurality of axially spaced annular ribs 27 which provide additional strength in the member 12 while permitting the requisite flexibility.

In the assembly of the structure, the tooth 11 is coupled to the link bar 20 and the mounting member 12 is then bonded to the connection therebetween. The link bar 20 is then inserted into the rake bar 10 through the opening 19 until the surface 25 contacts the rake bar 10. In this position the top portion of the opening 21 will be somewhat below the position shown in FIGURE 2. Accordingly, as the pin 13 is inserted through the openings 15, 21 and 16, it will be seen that the link bar 20 will be slightly raised to firmly seat the mounting member 12 against the rake bar 10.

By the foregoing arrangement the tooth 11 is capable of pivoting in virtually any direction with respect to the rake bar 10 in response to the imposition of loads on the tooth during operation. The mounting member 12 is of sufficient strength to normally retain the tooth 11 in the position shown, while at the same time permitting the tooth to pivot with respect to the rake bar. The structural interconnection of the tooth with the link bar 20 provides a positive connection preventing the loss of teeth even under the imposition of extraordinary loads. Accordingly, the retention of the teeth on the rake bar is not dependent on the load bearing capacity of a resilient mounting member as in prior assemblies.

Various changes may occur to those skilled in the art. The invention is therefore not to be thought of as limited to the specific embodiment set forth.

What is claimed is:
1. A rake tooth structure for mounting on a rake bar, comprising:
link means supported on said rake bar;
an elongated rake tooth;
means directly interconnecting said link means and said rake tooth and providing an articulated connection therebetween;

and an elastomer mounting member reacting against said connection for resiliently resisting articulation of said rake tooth with respect to said rake bar.

2. The subject matter of claim 1, including pin means extending through said rake bar, and said link means being coupled to said pin means.

3. A rake tooth structure for mounting on a rake bar, comprising:
pin means extending through said rake bar;
link means coupled to said pin means;
an elongated rake tooth;
means directly interconnecting said link means and said rake tooth and providing an articulated connection therebetween;
and an elastomer mounting member bonded to said connection for resiliently resisting articulation of said rake tooth with respect to said rake bar.

4. The subject matter of claim 3, in which said link means includes an opening defined therethrough, and said rake tooth includes a bent-over end portion passing through said opening to form said connection.

5. The subject matter of claim 3, in which said mounting member includes a cylindrical portion terminating at its upper end in a concave surface for engaging said rake bar with a complementary fit, and said mounting member including a downwardly extending portion of generally decreasing diameter surrounding said connection.

6. A rake tooth structure for mounting on a tubular rake bar, comprising:
a pin extending transversely through said rake bar;
a link bar coupled to said pin within said rake bar and having an end portion extending outwardly from said rake bar, said end portion inclduing an opening defined therethrough;
an elongated rake tooth having a bent-over end portion received through said opening to form an articulated connection with said link bar;
an elastomer mounting member bonded to said connection and reacting against said rake bar for resiliently supporting said rake tooth with respect to said rake bar.

7. The subject matter of claim 6, in which said mounting member includes a cylindrical portion terminating at its upper end in a concave surface for engaging said rake bar with a complementary fit, said mounting member including a downwardly extending portion of generally decreasing diameter surrounding said connection.

References Cited

UNITED STATES PATENTS

| | | | |
|---|---|---|---|
| 3,157,019 | 11/1964 | Brackbill | 56—400 |
| 3,192,696 | 7/1965 | Hurry | 56—400 |
| 3,253,394 | 5/1966 | Johnston et al. | 56—400 |
| 3,400,527 | 9/1968 | Woodring | 56—294 |

ANTONIO F. GUIDA, Primary Examiner